UNITED STATES PATENT OFFICE.

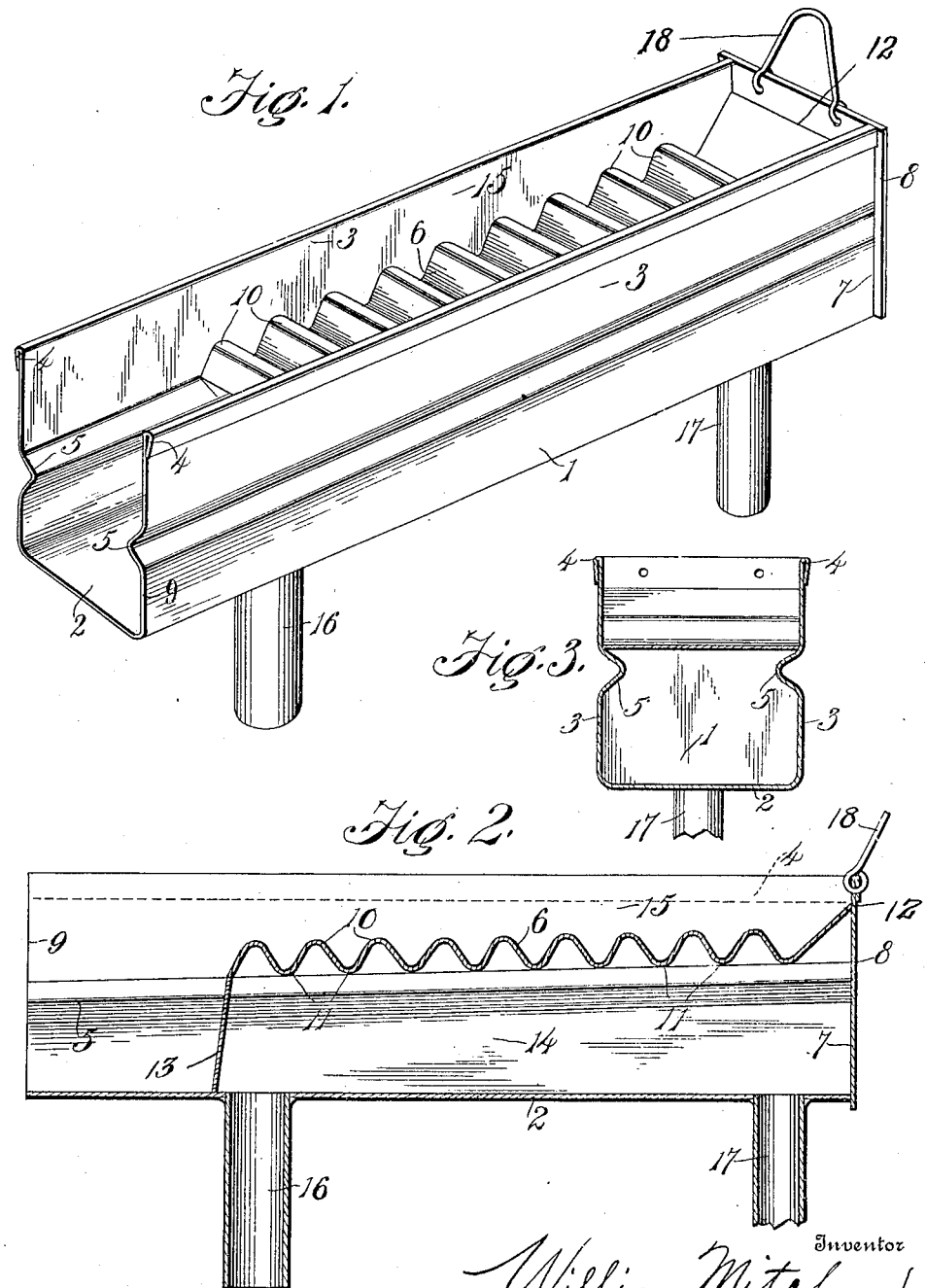

WILLIAM MITCHAM, OF ALBANY, OREGON.

MILK-COOLER.

No. 913,418.   Specification of Letters Patent.   Patented Feb. 23, 1909.

Application filed June 17, 1908. Serial No. 439,024.

*To all whom it may concern:*

Be it known that I, WILLIAM MITCHAM, a citizen of the United States, residing at Albany, in the county of Linn and State of Oregon, have invented certain new and useful Improvements in Milk-Coolers, of which the following is a specification, reference being had to the accompanying drawings.

My invention relates to improvements in milk coolers and aerators, and more particularly one adapted to be attached to a hand separator to receive the milk or cream from the same and conduct it to a suitable tank or receptacle.

The object of the invention is to improve and simplify the construction and operation of devices of this character and thereby render the same less expensive and more efficient.

With the above and other objects in view, the invention consists of the novel features of construction and the combination and arrangement of parts hereinafter fully described and claimed, and illustrated in the accompanying drawings, in which—

Figure 1 is a perspective view of the invention; and Figs. 2 and 3 are longitudinal and transverse sectional views.

My invention comprises a trough-like body 1 of U-shape in cross section preferably constructed from a single piece of sheet metal by bending the same to provide a bottom 2 and two upright parallel sides 3, the upper edges of the latter being folded over upon themselves, as shown at 4, to strengthen said sides and to provide a smooth upper edge for the open top of the body. Formed in the sides 3 at a suitable distance beneath their upper edges are longitudinally extending, inwardly projecting supporting ribs 5. The latter are formed by crimping the sides 3 inwardly and they are arranged at opposite points upon the two sides so as to support a corrugated partition 6. They are inclined downwardly from the upper end 7 of the body which is closed by a plate or head 8 to the lower open end 9 of the body so as to support the partition 6 in a downwardly inclined position. The partition 6 is in the form of a metal sheet corrugated transversely, as shown at 10, and having its angular edges 11 supported upon and soldered to the angular or V-shaped ribs 5. The upper end of the partition or corrugated plate 6 is soldered or otherwise secured at 12 to the plate or head 8 and its lower end 13 is extended downwardly and soldered to the bottom 2 of the body at a point adjacent to the open end 9 of the latter.

From the foregoing it will be seen that the partition 6 divides the body into a lower chamber or compartment 14 for cold water or any other cooling medium and an upper trough-like compartment 15 for the milk or cream, and that the top of said lower compartment forms the bottom of the trough in order that the milk or cream in passing over the corrugated member 6 will be cooled and aerated.

Arranged in the bottom 2 of the body adjacent to the opposite ends of the compartment 14 are water inlet and outlet pipes 16, 17. The inlet pipe 16 is larger in diameter than the outlet pipe 17 so that a slight pressure will be maintained in the compartment 14 and the cold water will be kept at all times in contact with the under face of the corrugated partition or plate 6. Upon the upper end of the body is provided a bail 18 which may be engaged with the spout of a separator to separate the cooler.

In use, cold water is forced through the chamber 14 while the milk or cream from the separator is discharged into the upper end of the trough or chamber 15 so that the milk or cream in passing over the transverse corrugations in the bottom of said trough will be aerated and cooled by the cold water in the compartment 14. The milk or cream is discharged from the open end 9 of the body into a suitable vat or receptacle.

Having thus described my invention what I claim is:

A device of the character described comprising a U-shaped body having a bottom wall, parallel side walls and an end wall or head, the side walls having inwardly extending supporting ribs formed by crimping the same, a transversely corrugated partition plate arranged between the side walls and supported by and secured to said ribs, one end of the plate being secured to said end or head of the body and its other end being secured to the bottom of the body adjacent to the open end of the latter, said partition dividing the body into a lower chamber for a cooling medium and an upper trough for the milk or cream, inlet and outlet pipes adjacent to the opposite ends of the lower chamber, the inlet pipe being of larger diameter than the outlet pipe, and a suspending bail upon said end wall or head substantially as and for the purpose set forth.

In testimony whereof I hereunto affix my signature in the presence of two witnesses.

WILLIAM MITCHAM.

Witnesses:
L. M. CURL,
LEILA MITCHELL.